United States Patent
Tanaka et al.

(10) Patent No.: US 12,103,476 B2
(45) Date of Patent: Oct. 1, 2024

(54) WIRE HARNESS

(71) Applicant: SUMITOMO WIRING SYSTEMS, LTD., Yokkaichi (JP)

(72) Inventors: Kosuke Tanaka, Yokkaichi (JP); Ryuta Saito, Yokkaichi (JP); Katsutoshi Izawa, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/989,189

(22) Filed: Nov. 17, 2022

(65) Prior Publication Data
US 2023/0174003 A1 Jun. 8, 2023

(30) Foreign Application Priority Data
Nov. 26, 2021 (JP) ................... 2021-192265

(51) Int. Cl.
*B60R 16/02* (2006.01)
*H01B 7/40* (2006.01)
*H02G 3/32* (2006.01)

(52) U.S. Cl.
CPC ........... *B60R 16/0215* (2013.01); *H01B 7/40* (2013.01); *H02G 3/32* (2013.01)

(58) Field of Classification Search
CPC .............. H02G 3/04; H02G 3/30; H02G 3/32; H02G 3/40; H02G 3/0418; H02G 3/0462; H02G 3/0481; B60R 16/0207; B60R 16/0215; H01B 7/0045

USPC ................. 248/68.1, 73, 74.1–74.4
See application file for complete search history.

(56) References Cited

U.S. PATENT DOCUMENTS

| | | | |
|---|---|---|---|
| 7,740,211 B2 * | 6/2010 | Dukes | H02G 1/08 248/74.1 |
| 2007/0128929 A1 * | 6/2007 | Oga | F16L 3/1025 439/578 |
| 2012/0067620 A1 * | 3/2012 | Duddy | H02G 3/32 29/428 |
| 2014/0131528 A1 * | 5/2014 | Blakeley | H02G 3/32 248/74.2 |
| 2015/0323101 A1 * | 11/2015 | Hobson | F16L 3/127 29/525.08 |
| 2019/0089142 A1 | 3/2019 | Sugino | |
| 2020/0274343 A1 | 8/2020 | Sugino | |

FOREIGN PATENT DOCUMENTS

| | | | | |
|---|---|---|---|---|
| DE | 4141689 A1 * | 6/1993 | | B60K 15/01 |
| JP | 2009038899 A * | 2/2009 | | H02G 3/30 |

\* cited by examiner

*Primary Examiner* — Paresh Paghadal
(74) *Attorney, Agent, or Firm* — Oliff PLC (57) ABSTRACT

A wire harness including: a wire harness body having an electric wire and a cover covering a periphery of the electric wire; a first path restrictor attached to a periphery of the cover and restricting a path of the wire harness body; and an attachment attached to a periphery of a portion of the first path restrictor in a lengthwise direction thereof.

10 Claims, 8 Drawing Sheets

WIRE HARNESS

BACKGROUND

The present disclosure relates to a wire harness.

Conventionally, some vehicle wire harnesses include a wire harness body having an electric wire member and a covering member covering the electric wire member, and a path-restricting member that is attached to the periphery of the covering member and restricts the path of the wire harness body (e.g., see JP 2019-53894A).

SUMMARY

In wire harnesses such as the aforementioned one, the path restricting member may be attached to an attachment member such as another path-restricting member. In this case, it is desired that the area where the path-restricting member is attached to the attachment member does not loosen. Note that looseness in the attachment area may causes damage to the attachment area by vibration or the like, for example.

An exemplary aspect of the disclosure provides a wire harness in which looseness can be suppressed.

A wire harness of the present disclosure includes: a wire harness body having an electric wire and a cover covering a periphery of the electric wire; a first path restrictor attached to a periphery of the cover and restricting a path of the wire harness body; and an attachment attached to a periphery of a portion of the first path restrictor in a lengthwise direction thereof, wherein: the first path restrictor has an insertion opening that is open in a direction orthogonal to the lengthwise direction of the first path restrictor and extends over an entirety of the first path restrictor in the lengthwise direction, the attachment has: a receiver covering the first path restrictor partially in a circumferential direction thereof, a lid covering, together with the receiver, an entire periphery of the first path restrictor, and a suppression member suppressing separation of the lid from the receiver by pressing the receiver and the lid from outside the lid, and the receiver and the lid hold the first path restrictor from opposite sides.

According to the wire harness of the present disclosure, looseness can be suppressed.

DETAILED DESCRIPTION OF EMBODIMENTS

Description of Embodiments of Present Disclosure

Firstly, modes for carrying out the present disclosure will be listed and described.

A wire harness of the present disclosure is

[1] a wire harness including: a wire harness body having an electric wire member and a covering member covering a periphery of the electric wire member; a first path-restricting member attached to a periphery of the covering member and restricting a path of the wire harness body; and an attachment member attached to a periphery of a portion of the first path-restricting member in a lengthwise direction thereof, wherein the first path-restricting member has an insertion opening that is open in a direction orthogonal to the lengthwise direction of the first path-restricting member and extends over an entirety of the first path-restricting member in the lengthwise direction, the attachment member has a receiver portion covering the first path-restricting member partially in a circumferential direction thereof, a lid covering, together with the receiver portion, an entire periphery of the first path restricting member, and a suppression member suppressing separation of the lid from the receiver portion by pressing the receiver portion and the lid from outside the lid, and the receiver portion and the lid hold the first path-restricting member from opposite sides.

According to this configuration, the suppression member that suppresses separation of the lid from the receiver portion by pressing them from outside the lid is provided. Therefore, separation of the lid from the receiver portion is suppressed. Further, the receiver portion and the lid hold the first path restricting member from the opposite sides. This suppresses looseness between the receiver portion and the lid compared with, for example, a configuration in which the lid is integrally molded with the receiver portion via a thin-walled hinge portion, and the lid is locked to the receiver portion only through engagement of the claw portions in the closed state. That is, the configuration in which the thin-walled hinge portion and the claw portions are provided is more likely to loosen the receiver portion and the lid in the areas of the hinge portion and the claw portions, but this can be avoided. Accordingly, the receiver portion and the lid can hold the first path-restricting member from the opposite sides without looseness, thus suppressing looseness between the first path-restricting member and the attachment member.

[2] It is preferable that the suppression member is a flexible C-ring covering the receiver portion and the lid from outside.

According to this configuration, the suppression member is a flexible C-ring that covers the receiver portion and the lid from outside. Thus, separation of the lid from the receiver portion can be suppressed with a simple configuration.

[3] It is preferable that a first end portion of the receiver portion in the circumferential direction is joined, via a hinge portion, to a second end portion of the lid in the circumferential direction, and the suppression member is a spring member biasing a second end side of the receiver portion in the circumferential direction and a first end side of the lid in the circumferential direction, in respective directions in which the second end side of the receiver portion and the first end side of the lid approach each other.

According to this configuration, the suppression member is a spring member that biases the second end side of the receiver portion in the circumferential direction and the first end side of the lid in the circumferential direction, in respective directions in which the second end side of the receiver portion and the first end side of the lid approach each other. Thus, the biasing force of the spring member can favorably suppress separation of the lid from the receiver portion.

[4] It is preferable that the suppression member is a cable tie tying the receiver portion and the lid together while covering an entirety of the receiver portion and the lid in the circumferential direction.

According to this configuration, the suppression member is a cable tie that ties the receiver portion and the lid together while covering the entirety of the receiver portion and the lid in the circumferential direction. Therefore, separation of the lid from the receiver portion can be suppressed with a simple configuration.

[5] It is preferable that at least one of the receiver portion and the lid has an engaging portion capable of engaging with the suppression member in a lengthwise direction of the attachment member.

According to this configuration, at least one of the receiver portion and the lid has an engaging portion capable of engaging with the suppression member in the lengthwise direction of the attachment member. This configuration can suppress a shift of the suppression member in the lengthwise direction of the attachment member.

[6] It is preferable that the attachment member is a second path-restricting member attached to the periphery of the covering member and restricting the path of the wire harness body, and the receiver portion is provided at an end portion of the second path-restricting member in a lengthwise direction thereof and covers an end portion of the first path-restricting member in the lengthwise direction thereof, partially in the circumferential direction.

According to this configuration, the receiver portion is provided at an end portion of the second path-restricting member in the lengthwise direction and covers an end of the first path restricting member in the lengthwise direction, partially in the circumferential direction. Thus, the first path-restricting member is joined to the second path-restricting member in the lengthwise direction. According, the first path restricting member and the second path-restricting member continuously restrict the path of the wire harness body.

[7] It is preferable that the first path-restricting member restricts a path of a linear portion that is a linear part of the path of the wire harness body, and the second path-restricting member restricts a path of a bent portion that is a bent part of the path of the wire harness body.

According to this configuration, the first path-restricting member restricts the path of the linear portion, and the second path-restricting member restricts the path of the bent portion. Thus, the paths of the linear portion and the bent portion of the wire harness body are continuously kept from deviating from respective desired paths.

Details of Embodiments of Present Disclosure

Specific examples of the wire harness of the present disclosure will be described below with reference to the drawings. The drawings may partially exaggerate or simplify configurations for convenience of description. The dimensional ratio of each part may differ between the drawings. The terms "parallel" and "orthogonal" in the present specification include not only the case of being strictly parallel or orthogonal but also the case of being substantially parallel or orthogonal within the range that exhibits the operation and effects of the present embodiment. Note that the present disclosure is not limited to these examples but is described by the claims, and is intended to include all changes made within the meaning and scope equivalent to the claims.

Overall Configuration of Wire Harness 10

Figure 1:
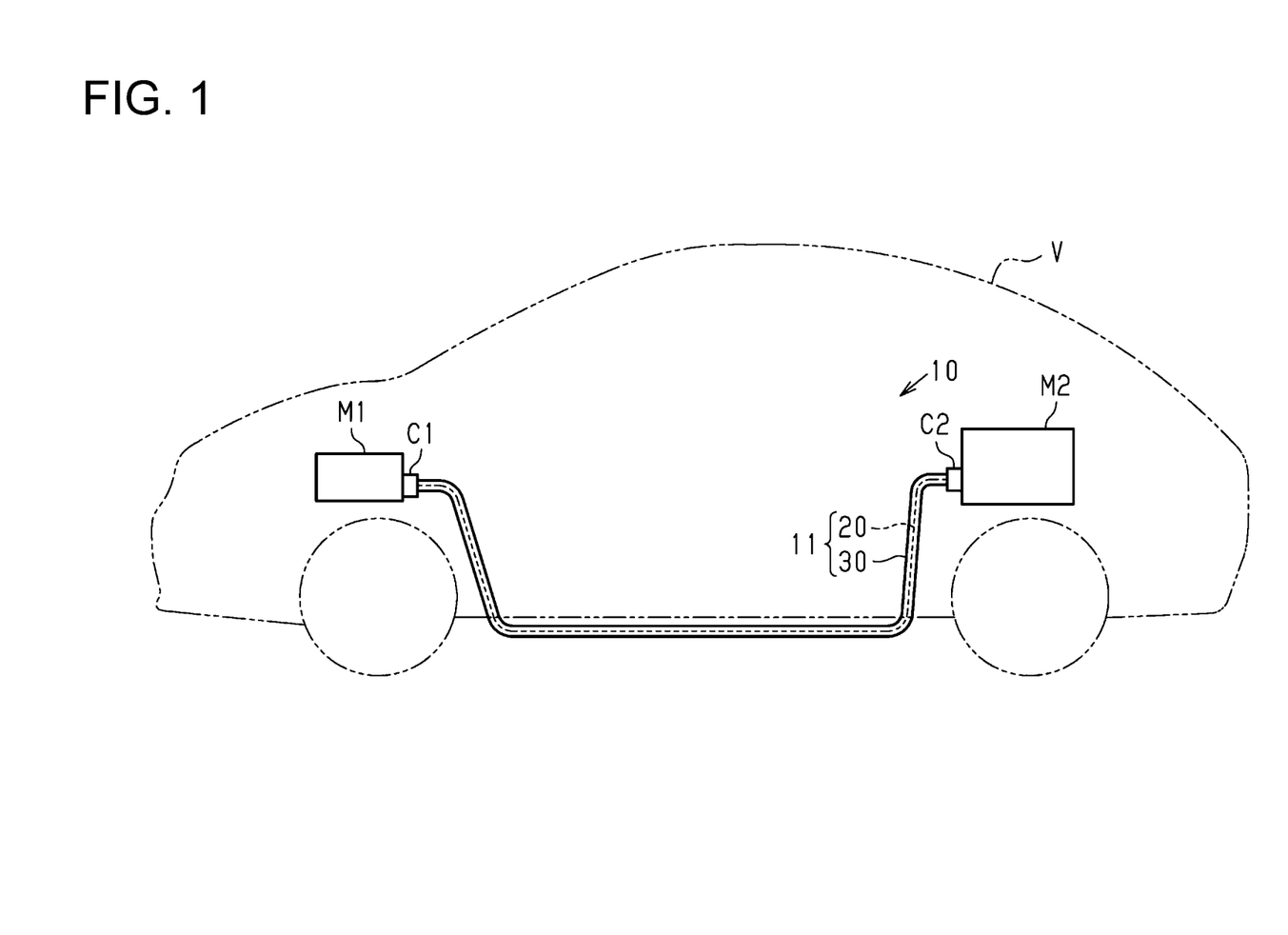
FIG. 1 shows a schematic configuration of a wire harness of an embodiment.

A wire harness 10 shown in FIG. 1 is, for example, installed in a vehicle V, such as a hybrid vehicle or an electric vehicle. The wire harness 10 electrically connects two or more in-vehicle devices to each other. The in vehicle devices are electrical devices installed in the vehicle V. The wire harness 10 electrically connects an inverter M1 installed in a front part of the vehicle V to a high-voltage battery M2 installed behind the inverter M1 in the vehicle V, for example. The wire harness 10 has an elongated shape extending in the front-back direction of the vehicle V, for example. The wire harness 10 is arranged in the vehicle V so that an intermediate section of the wire harness 10 in the lengthwise direction passes outside the vehicle interior, e.g., under the floor of the vehicle V, for example.

The inverter M1 is connected to a motor (not shown) for driving wheels that serves as a power source for the vehicle to travel, for example. The inverter M1 generates AC power from DC power of the high voltage battery M2, and supplies the AC power to the motor. The high-voltage battery M2 is, for example, a battery capable of supplying a voltage of several hundred volts.

The wire harness 10 has a wire harness body 11. The wire harness body 11 has an electric wire member 20 (electric wire) and a cylindrical covering member 30 (cover) that covers the periphery of the electric wire member 20. The wire harness 10 has connectors C1 and C2 attached to respective end portions of the electric wire member 20. One end portion of the electric wire member 20 in the lengthwise direction is connected to the inverter M1 via the connector C1, and the other end portion of the electric wire member 20 in the lengthwise direction is connected to the high voltage battery M2 via the connector C2.

Figure 2:
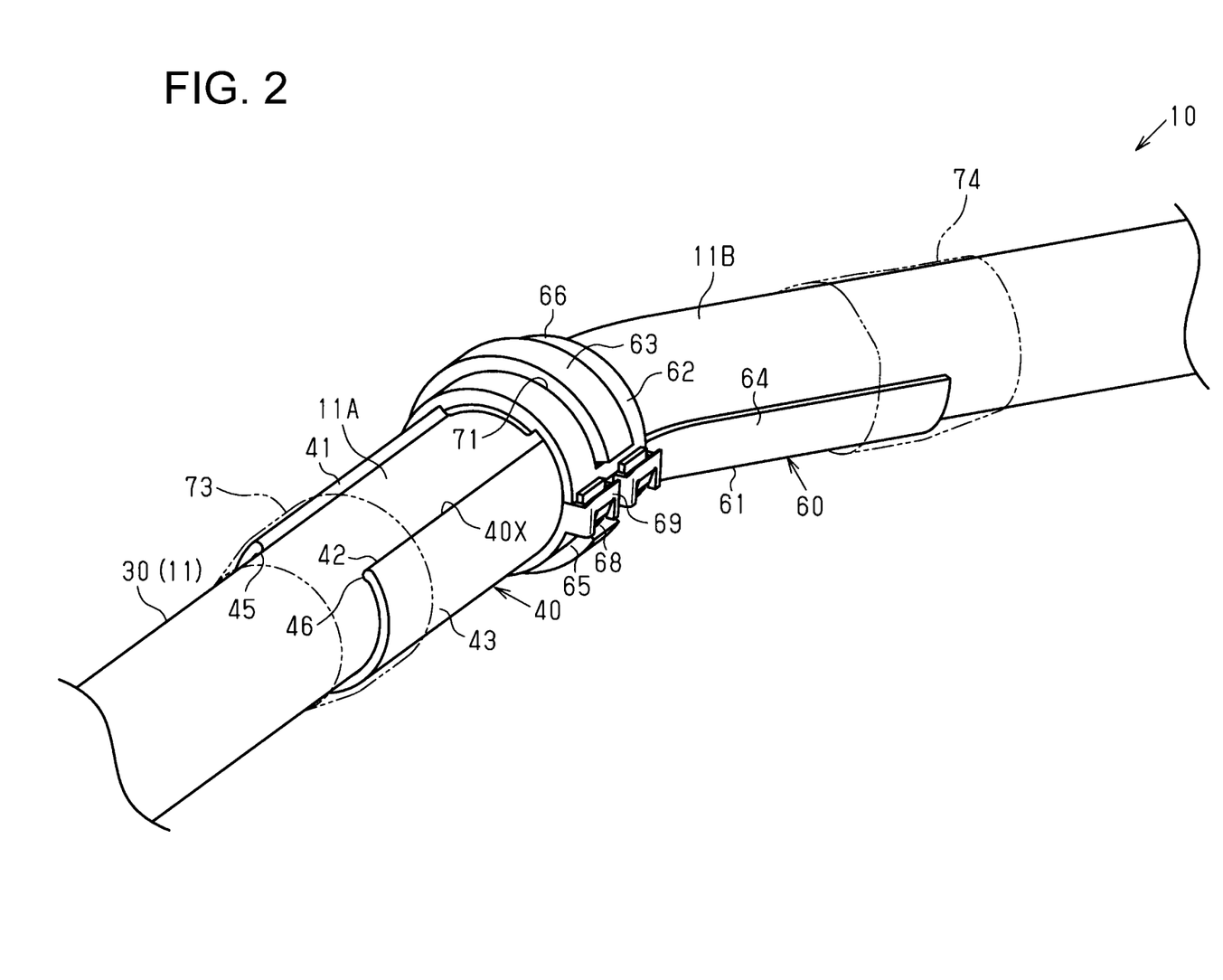
FIG. 2 is a schematic perspective view of the wire harness of the embodiment.
Figure 3:
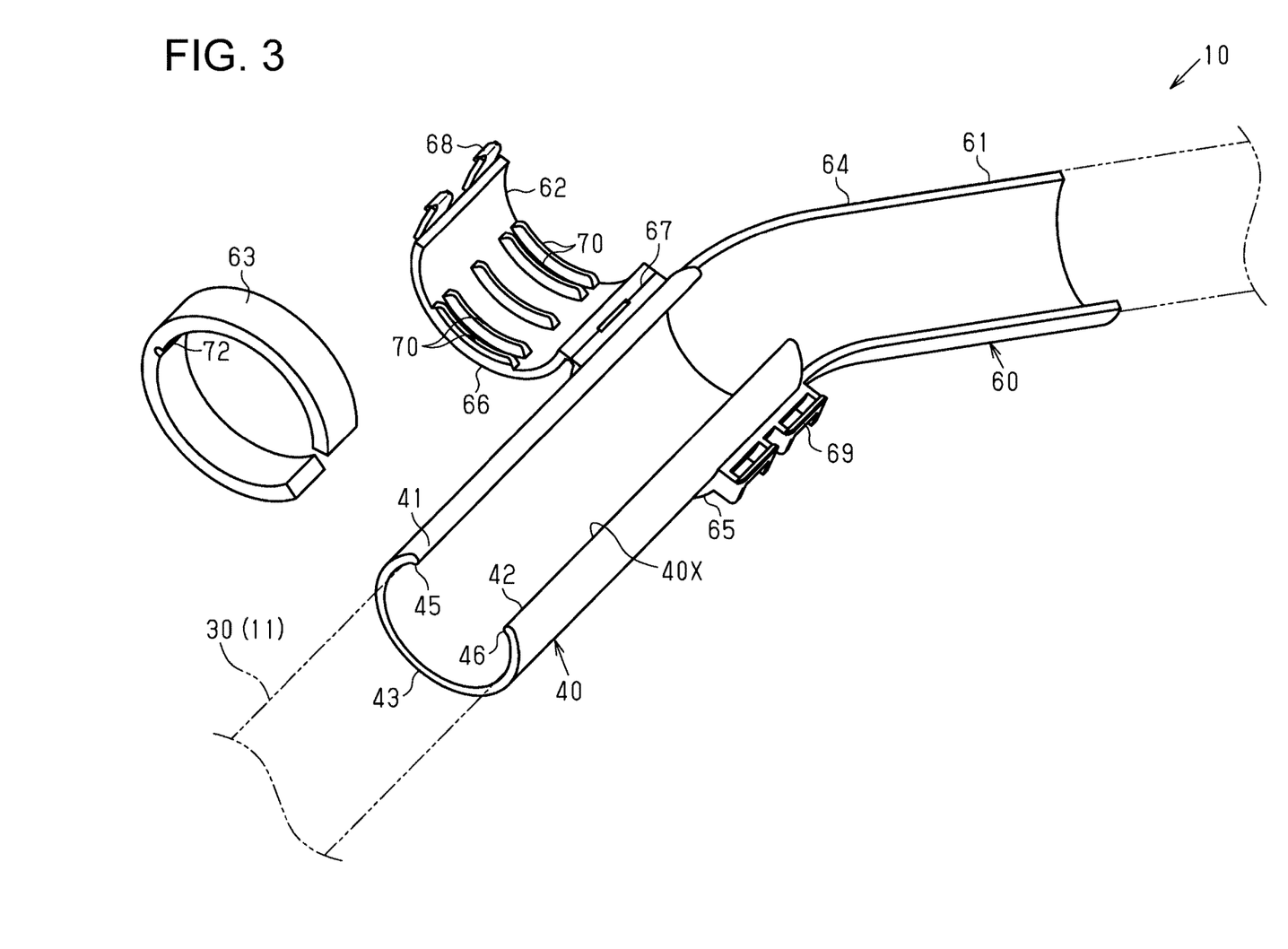
FIG. 3 is a schematic exploded perspective view of the wire harness of the embodiment.

As shown in FIGS. 2 and 3, the wire harness 10 has a first path-restricting member 40 (first path restrictor) that is attached to the periphery of the covering member 30, and a second path-restricting member 60 (second path restrictor) serving as an attachment member (attachment) that is attached to the periphery of the covering member 30. The first path-restricting member 40 and the second path-restricting member 60 restrict the path through which the wire harness body 11 is arranged. Note that FIG. 1 omits the first path-restricting member 40 and the second path-restricting member 60.

Configuration of Electric Wire Member 20

Figure 4:
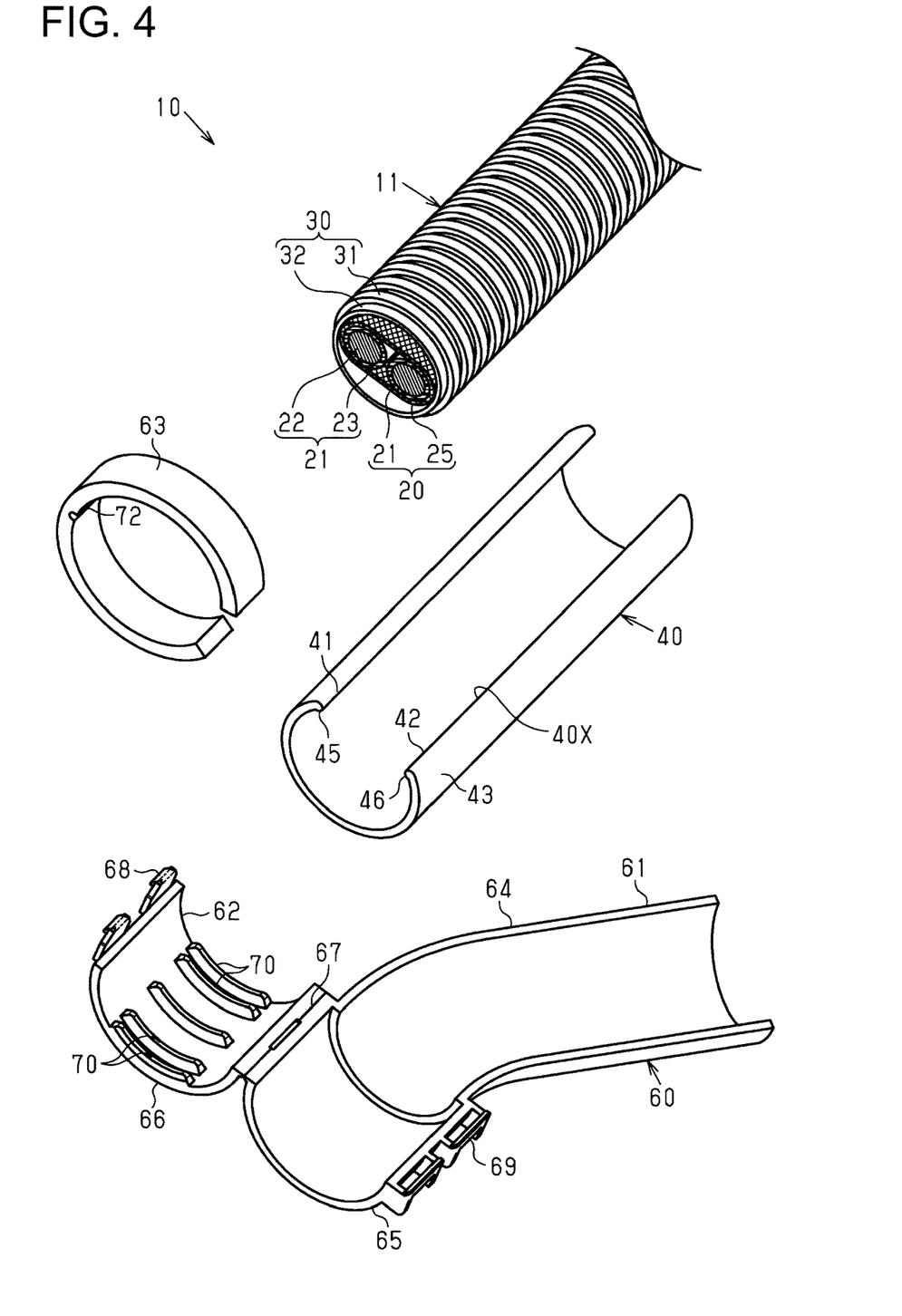
FIG. 4 is a schematic exploded perspective view of the wire harness of the embodiment.
Figure 5:
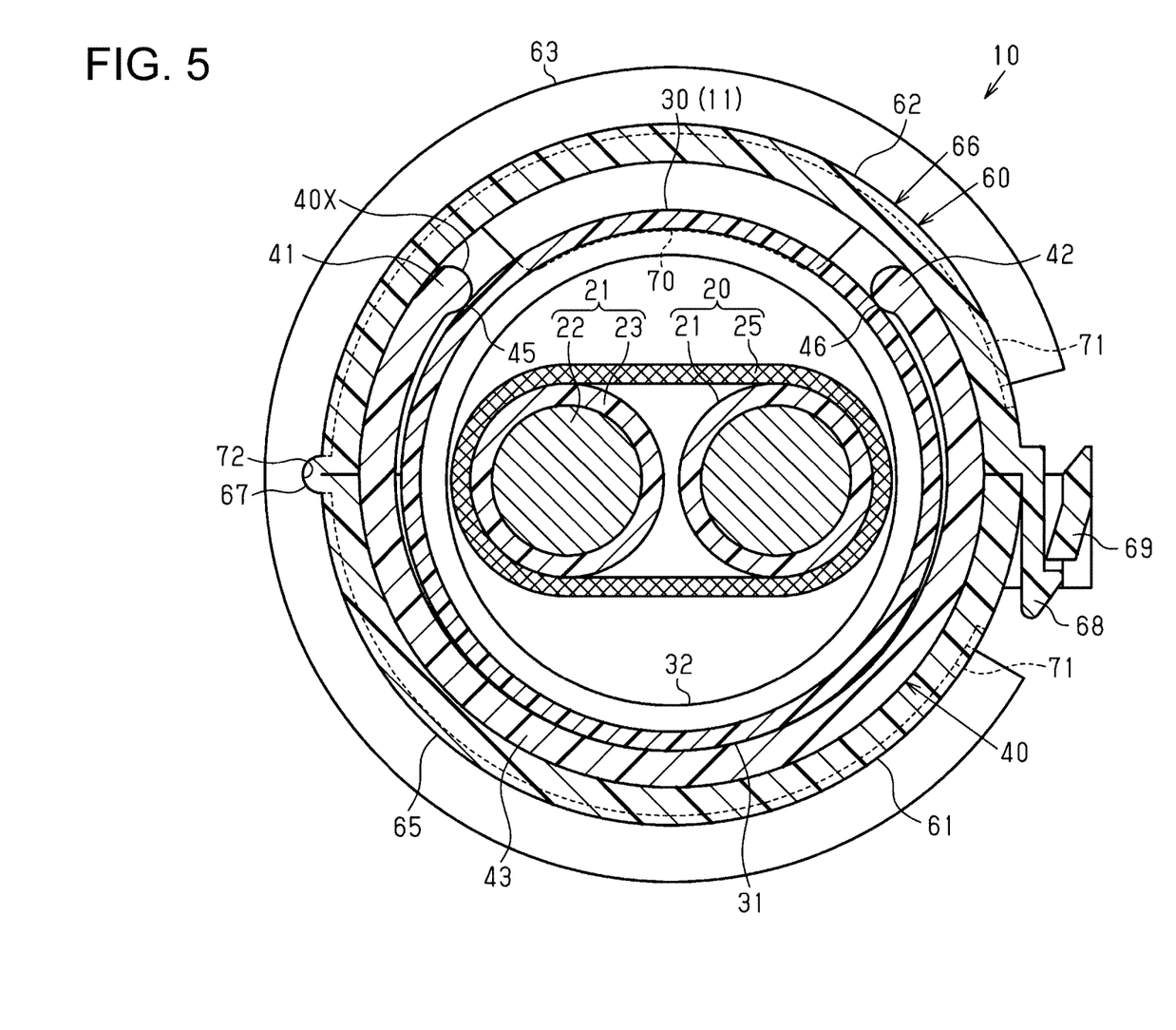
FIG. 5 is a schematic lateral cross sectional view of the wire harness of the embodiment.

As shown in FIGS. 4 and 5, the electric wire member 20 has, for example, one or more (two in the present embodiment) electric wires 21, and a braided member 25 that collectively surrounds the periphery of the plurality of electric wires 21, for example.

As shown in FIG. 5, each electric wire 21 is a coated electric wire having a conductive core wire 22 and an insulating coating 23 that surrounds the periphery of the core wire 22. The electric wires 21 are high-voltage electric wires capable of dealing with high voltage and large current, for example. The electric wires 21 may be unshielded electric wires that do not have their own electromagnetic shield structure, or may be shielded electric wires having their own electromagnetic shield structure, for example. The electric wires 21 of the present embodiment are unshielded electric wires.

The core wire 22 may be, for example, a stranded wire formed by twisting a plurality of metal wires together, or by a single core wire made from a single conductor. The single core wire may be, for example, a column conductor constituted by a single columnar metal rod having an internally solid structure, or may be a cylindrical conductor having an internally hollow structure. The core wire 22 may also be a combination of a stranded wire, a column conductor and/or a cylindrical conductor. The material of the core wire 22 can be a copper⁻ or aluminum-based metal material, for example.

The insulating coating 23 entirely covers the peripheral face of the core wire 22 in the circumferential direction, for example. The insulating coating 23 is made of an insulating resin material, for example.

The shape of a cross section of each electric wire 21 obtained by cutting the electric wire 21 by a plane orthogonal to the lengthwise direction of the electric wires 21, i.e., the lateral cross-sectional shape of the electric wire 21 may be any shape. The lateral cross-sectional shape of each electric wire 21 is, for example, a circular shape, a semicircular shape, a polygonal shape, a square shape, a flat shape, or the like. The lateral cross-sectional shape of each electric wire 21 of the present embodiment is a circular shape.

The braided member 25 has a tubular shape that collectively surrounds the periphery of the plurality of electric wires 21 as a whole, for example. The braided member 25 can be, for example, a braided wire formed by braiding a plurality of metal wires, or a braided wire that is formed by braiding metal wires and resin wires in combination, for example. The material of the metal wires may be a copper⁻ or aluminum-based metal material, for example. Although not shown in the figures, both end portions of the braided member 25 in the lengthwise direction are connected to earth at the connectors C1 and C2 (see FIG. 1), for example.

Configuration of Covering Member 30

As shown in FIG. 4, the covering member 30 has a tubular shape that surrounds the entire periphery of the electric wire member 20 in the circumferential direction. The covering member 30 of the present embodiment has a cylindrical shape. The covering member 30 has, for example, a peripheral wall that is entirely continuous in the circumferential direction of the covering member 30. The covering member 30 seals the inside of the covering member 30 over the entire periphery in the circumferential direction, for example. The covering member 30 has a function of protecting the electric wire member 20 from flying objects and water droplets, for example.

The covering member 30 is flexible and can be easily bent, for example. Examples of a flexible covering member 30 include a resin corrugated tube and a rubber waterproofing cover, for example. The covering member 30 of the present embodiment is a resin corrugated tube having a bellows shape whose diameter repeatedly increases and decreases in the lengthwise direction of the covering member 30. That is, the covering member 30 of the present embodiment has a bellows structure in which a large-diameter portion 31 and a small-diameter portion 32 whose diameter is smaller than that of the large-diameter portion 31 are alternately and continuously provided in the lengthwise direction of the covering member 30. Each of the large diameter portion 31 and the small-diameter portion 32 has an annular shape that circles once in the circumferential direction of the covering member 30, for example. The material of the covering member 30 may be, for example, polyolefin, polyamide, polyester, a synthetic resin such as ABS resin, or the like. Note that FIGS. 1 to 3 simplify the covering member 30 for simplification of the drawing.

Configuration of First Path-Restricting Member 40 and Second Path Restricting Member 60

As shown in FIGS. 2 and 3, the first path-restricting member 40 and the second path-restricting member 60 hold the covering member 30. The first path-restricting member 40 and the second path-restricting member 60 are harder than the covering member 30, for example. The first path restricting member 40 and the second path-restricting member 60 have a hardness that makes it difficult for them to bend portion in a direction orthogonal to the lengthwise direction of the wire harness body 11 compared to the covering member 30. The first path-restricting member 40 and the second path-restricting member 60 thus restrict the path of the wire harness body 11. For example, the first path-restricting member 40 and the second path-restricting member 60 assist the covering member 30 so that the wire harness body 11 does not warp due to its own weight and deviate from a desired path.

As shown in FIG. 2, the first path-restricting member 40 is provided in portions of the wire harness body 11 in the lengthwise direction. The first path-restricting member 40 is attached to the periphery of the covering member 30 in a linear portion 11A, which is a linear part of the path of the wire harness body 11, for example. The first path-restricting member 40 restricts the path of the wire harness body 11 in the linear portion 11A. Here, the linear portion 11A is a portion in which the path of the wire harness body 11 linearly extends in one direction. Note that one or more first path-restricting members 40 are provided in accordance with the path of the wire harness body 11.

The second path-restricting member 60 is provided in portions of the wire harness body 11 in the lengthwise direction. The second path-restricting member 60 is attached to the periphery of the covering member 30 in a bent portion 11B, which is a portion at which the path of the wire harness body 11 is bent, for example. The second path-restricting member 60 restricts the path of the wire harness body 11 in the bent portion 11B. Here, the bent portion 11B is a portion in which the path of the wire harness body 11 is bent to deviate from a straight line. Note that one or more second path-restricting members 50 are provided in accordance with the path of the wire harness body 11.

Configuration of First Path-Restricting Member 40

As shown in FIG. 5, the first path-restricting member 40 covers the periphery of the covering member 30 partially in the circumferential direction thereof. The first path-restricting member 40 has a shape that covers the periphery of the covering member 30 partially in the circumferential direction thereof. The lateral cross-sectional shape of the first path-restricting member 40 is a C-shape as a whole. The first path-restricting member 40 covers an area that is more than half of the periphery of the covering member 30, for example. That is, the first path-restricting member 40 covers an area that is more than half of the entire periphery of the covering member 30 in the circumferential direction thereof. As shown in FIG. 2, the first path-restricting member 40 extends in the lengthwise direction of the covering member 30 in the linear portion 11A. The first path-restricting member 40 has a shape that linearly extends in one direction, for example. The lateral cross-sectional shape of the first path restricting member 40 is uniform over the entire length of the first path restricting member 40 in the lengthwise direction, for example.

The first path-restricting member 40 is made of metal or resin, for example. The first path-restricting member 40 of the present embodiment is made of resin. Examples of the material of the first path-restricting member 40 can include synthetic resins such as polypropylene, polyamide, and polyacetal. The first path-restricting member 40 can be produced by means of any well-known production method such as extrusion or injection molding, for example. In the present embodiment, the first path-restricting member 40 is an extruded product that is produced by means of extrusion. Accordingly, the first path-restricting member 40 can be easily produced by using an extruder that extrudes the raw material of the first path-restricting member 40 in the lengthwise direction. Further, multiple types of first path restricting members 40 with different dimensions in the lengthwise direction can be produced by using a single extruder. For example, multiple types of first path-restricting members 40 with different dimensions in the lengthwise direction can be produced by cutting the base material of the first path-restricting member 40 formed with a single extruder at any length using a cutting machine.

The first path-restricting member 40 has an insertion opening 40X that is open in a direction orthogonal to the lengthwise direction of the first path-restricting member 40. The insertion opening 40X extends over the entire length of the first path-restricting member 40 in the lengthwise direction. The first path-restricting member 40 has a first end portion 41 and a second end portion 42 that are two end portions of the first path-restricting member 40 in the circumferential direction and form the insertion opening 40X. The first path-restricting member 40 has a joint portion 43 that joins the first end portion 41 to the second end portion 42. In other words, the first path-restricting member 40 has a joint portion 43 that partially covers the covering member 30 in the circumferential direction, a first end portion 41 and a second end portion 42 provided at respective end portions of the joint portion 43, and an insertion opening 40X formed by the first end portion 41 and the second end portion 42.

As shown in FIG. 5, the joint portion 43 constitutes a main part of the first path-restricting member 40. The thickness of the joint portion 43 in the radial direction is uniform in the circumferential direction of the first path-restricting member 40, for example. The lateral cross-sectional shape of the joint portion 43 is a shape aligned with the outer face of the covering member 30, for example. The lateral cross-sectional shapes of the first end portion 41, the second end portion 42, and the joint portion 43 are arc shapes, for example.

The first end portion 41 and the second end portion 42 are provided on the opposite sides in the circumferential direction of the first path-restricting member 40. The first end portion 41 and the second end portion 42 are separated from each other in the circumferential direction of the first path-restricting member 40 with the insertion opening 40X therebetween. In other words, the gap between the first end portion 41 and the second end portion 42 in the circumferential direction of the first path restricting member 40 constitutes the insertion opening 40X. Thus, the first path-restricting member 40 has a C-shape having the insertion opening 40X at a portion of the first path-restricting member 40 in the circumferential direction.

The lateral cross-sectional shapes of leading ends of the first end portion 41 and the second end portion 42 are curved shapes. The lateral cross-sectional shapes of the leading ends of the first end portion 41 and the second end portion 42 of the present embodiment are arc shapes.

The first path-restricting member 40 has a protruding portion 45 that protrudes from an inner face of the first end portion 41, and a protruding portion 46 that protrudes from an inner face of the second end portion 42. The protruding portions 45 and 46 protrude toward the covering member 30 inserted in the first path restricting member 40 and are in contact with the outer face of the covering member 30. The protruding portions 45 and 46 are in contact with the outer face of the large diameter portion 31 of the covering member 30. The protruding portion 45 protrudes from the inner face of the leading end of the first end portion 41, for example. The protruding portion 46 protrudes from the inner face of the leading end of the second end portion 42, for example. The lateral cross-sectional shapes of the protruding portions 45 and 46 are curved shapes, for example. The lateral cross-sectional shapes of the protruding portions 45 and 46 of the present embodiment are arc shapes.

As shown in FIG. 3, the protruding portions 45 and 46 extend in the lengthwise direction of the first path-restricting member 40. The protruding portions 45 and 46 extend over the entire length of the first path-restricting member 40 in the lengthwise direction, for example.

The protruding portions 45 and 46 presses the covering member 30 from outside the covering member 30. The protruding portions 45 and 46 and the joint portion 43 elastically hold the covering member 30. Thus, the first path-restricting member 40 is firmly joined to the covering member 30.

As shown in FIG. 5, the opening width of the insertion opening 40X, i.e., the shortest distance between the first end portion 41 and the second end portion 42 is smaller than the outer diameter of the covering member 30.

The opening width of the insertion opening 40X increases in response to elastic deformation of the first path-restricting member 40. For example, the opening width of the insertion opening 40X increases as a result of the covering member 30 being inserted into the insertion opening 40X from a direction orthogonal to the lengthwise direction of the first path restricting member 40. After the covering member 30 is inserted into the first path restricting member 40, the first path restricting member 40 is elastically restored to return to its original shape. The opening width of the insertion opening 40X then becomes smaller than the outer diameter of the covering member 30, and the first path-restricting member 40 is thus attached to the periphery of the covering member 30.

Configuration of Second Path Restricting Member 60

As shown in FIG. 2, the second path-restricting member 60 is attached to the periphery of a portion of the first path restricting member 40 in the lengthwise direction. The second path-restricting member 60 is attached to the periphery of an end portion of the first path-restricting member 40 in the lengthwise direction. Further, the second path-restricting member 60 is attached to the periphery of the covering member 30 in the bent portion 11B. The second path restricting member 60 extends in the lengthwise direction of the covering member 30 in the bent portion 11B. The second path-restricting member 60 is bent along the shape of the bent portion 11B, for example.

The second path-restricting member 60 has a second path-restricting body 61, a lid 62, and a suppression member 63.

The second path-restricting member 60 is made of metal or resin, for example. The second path-restricting member 60 of the present embodiment is made of resin. Examples of the material of the second path-restricting member 60 include synthetic resins such as polypropylene, polyamide, and polyacetal. The second path-restricting member 60 can be produced by means of a well-known production method such as injection molding, for example.

The second path restricting body 61 has a body portion 64 and a receiver portion 65 (receiver). In the present embodiment, the receiver portion 65 and the lid 62 constitute the covering portion 66.

The body portion 64 covers the periphery of the covering member 30 partially in the circumferential direction thereof. The body portion 64 has a shape that covers the periphery of the covering member 30 partially in the circumferential direction thereof. The lateral cross-sectional shape of the body portion 64 is a semi-cylindrical shape as a whole. The body portion 64 covers half of the periphery of the covering member 30. As shown in FIG. 2, the body portion 64 extends in the lengthwise direction of the covering member 30 in the bent portion 11B. The body portion 64 bends along the shape of the bent portion 11B.

The receiver portion 65 is provided at an end portion of the second path-restricting member 60 in the lengthwise direction that is also an end portion of the body portion 64 in the lengthwise direction. The receiver portion 65 covers, partially in the circumferential direction, the end portion 40a of the first path-restricting member 40 in the lengthwise direction. The receiver portion 65 has a shape that covers the periphery of the first path restricting member 40 partially in the circumferential direction thereof. The lateral cross-sectional shape of the receiver portion 65 is a semi-cylindrical shape as a whole. The receiver portion 65 has a semi-cylindrical shape whose diameter is larger than that of the body 51, for example. The receiver portion 65 covers half of the periphery of the first path-restricting member 40, for example.

The receiver portion 65 and the lid 62 are an integrally molded piece made of a single material. That is, the entire second path restricting member 60 of the present embodiment, including the second path-restricting body 61 and the lid 62, is an integrally molded piece made of a single material. The lid 62 is joined to the receiver portion 65 via a thin-walled hinge portion 67 (hinge). Specifically, a second end portion of the lid 62 in the circumferential direction is joined to a first end portion of the receiver portion 65 in the circumferential direction, via the thin-walled hinge portion 67. The lid 62 can rotate about the hinge portion 67 relative to the receiver portion 65. The covering portion 66 can be deformed to a closed state where the receiver portion 65 and the lid 62 are closed, and an open state where the receiver portion 65 and the lid 62 are open. The covering portion 66, when in the closed state, covers the periphery of the first path-restricting member 40.

The lid 62 has claw portions 68. The receiver portion 65 has engaged portions 69 with which the claw portions 68 can engage. Specifically, the engaged portions 69 are provided at the second end portion of the receiver portion 65 in the circumferential direction. The claw portions 68 are provided at the first end portion of the lid 62 in the circumferential direction. The claw portions 68 engage with the engaged portions 69 when the covering portion 66 is in the closed state. The lid 62 is fixed so as not to be rotatable relative to the receiver portion 65 as a result of the claw portions 68 engaging with the engaged portions 69. Specifically, the receiver portion 65 and the lid 62 are unable to relatively rotate after the claw portions 68 engage with the engaged portions 69, and the covering portion 66 is maintained in the closed state.

The lid 62 covers the entire periphery of the end portion 40a of the first path-restricting member 40 together with the receiver portion 65. Specifically, when the covering portion 66 is in the closed state, the lid 62 entirely covers the end portion 40a of the first path restricting member 40 along the periphery of the end portion 40a in the circumferential direction, together with the receiver portion 65. The lid 62 of the present embodiment covers a portion of the periphery of the first path restricting member 40 and a portion of the periphery of the covering member 30 that is exposed from the insertion opening 40X. The lateral cross-sectional shape of the lid 62 has a semi-cylindrical shape as a whole. The lid 62 has a semi-cylindrical shape with the same diameter as the diameter of the receiver portion 65. The lid 62 covers half of the periphery of the first path-restricting member 40 in the circumferential direction that is a portion of the periphery of the first path-restricting member 40 in the circumferential direction not being covered by the receiver portion 65.

As shown in FIG. 4, the lid 62 has one or more (five in the present embodiment) protrusions 70 that protrude from the inner face of the lid 62. The plurality of protrusions 70 are spaced apart from each other in the lengthwise direction of the second path-restricting member 60. Each protrusion 70 is provided at an intermediate portion of the lid 62 in the circumferential direction, for example. As shown in FIG. 5, each protrusion 70 protrudes toward the covering member 30 inserted in the second path-restricting member 60 when the covering portion 66 is in the closed state and the lid 62 is at the closed position, for example. Each protrusion 70 is fitted between two large diameter portions 31 of the covering member 30 when the lid 62 is at the closed position, for example. Each protrusion 70 has a leading end that comes into contact with a peripheral face of a small diameter portion 32, for example. The leading end of each protrusion 70 has an arc shape extending along the peripheral face of a small-diameter portion 32, for example. Thus, movement of the covering member 30 relative to the second path-restricting member 60 is suppressed in the lengthwise direction of the covering member 30. As a result, it is possible to favorably suppress a position shift of the second path-restricting member 60 relative to the covering member 30 in the lengthwise direction of the wire harness body 11.

As shown in FIGS. 2 and 5, the receiver portion 65 and the lid 62, which constitute the covering portion 66, each have an engaging recessed portion 71 serving as an engaging portion (engagement). The engaging recessed portions 71 are provided in an intermediate part of the covering portion 66 in the lengthwise direction. The engaging recessed portions 71 are recessed from the peripheral faces of the receiver portion 65 and the lid 62. The engaging recessed portions 71 extends over a large part of the area where the hinge portion 67, the claw portions 68, and the engaged portions 69 are not provided, in the periphery of the receiver portion 65 and the lid 62.

The suppression member 63 suppresses separation of the lid 62 from the receiver portion 65 by pressing the receiver portion 65 and the lid 62 from outside the lid 62.

Specifically, the suppression member 63 of the present embodiment is a flexible C-ring that covers the receiver portion 65 and the lid 62 from outside. The suppression member 63 has a C-shape. In other words, the suppression member 63 is a C-shaped member having a circular shape from which an area smaller than 180° is removed. The suppression member 63 of the present embodiment is a C-shaped member having a circular shape from which an area smaller than 90° is removed.

The suppression member 63 is made of metal or resin, for example. The suppression member 63 of the present embodiment is made of resin. Examples of the material of the suppression member 63 include synthetic resins such as polypropylene, polyamide, and polyacetal. The suppression member 63 can be produced by means of a well-known production method such as extrusion molding or injection molding, for example.

The suppression member 63 is attached to the receiver portion 65 and the lid 62 so as to be fitted to the engaging recessed portions 71. The suppression member 63 is kept from shifting in the lengthwise direction of the second path-restricting member 60 by engaging with the engaging recessed portions 71 in the lengthwise direction of the second path-restricting member 60. The suppression member 63 has a recessed portion 72 in the inner face at the center of the suppression member 63 in the circumferential direction. The suppression member 63 is attached to the receiver portion 65 and the lid 62 so that the hinge portion 67 is fitted to the recessed portion 72. The suppression member 63 presses the receiver portion 65 and the lid 62 together. The thus-attached suppression member 63 suppresses separation of the lid 62 from the receiver portion 65 by pressing the lid 62 and the receiver portion 65 from outside the lid 62 even if the receiver portion 65 and the lid 62 attempt to move slightly away from each other due to the engagement state between the claw portions 68 and the engaged portions 69, deformation of the hinge portion 67, or the like. The receiver portion 65 and the lid 62 thus hold the first path restricting member 40 from the opposite sides. In other words, the suppression member 63 keeps the receiver portion 65 and the lid 62 in a state of holding the first path-restricting member 40 from the opposite sides.

Further, the wire harness 10 has a slide restriction member 73 that restricts sliding movement of the first path-restricting member 40 in the lengthwise direction of the covering member 30, for example, as shown in FIG. 2. The wire harness 10 has a slide restriction member 74 that restricts sliding movement of the second path-restricting member 60 in the lengthwise direction of the covering member 30, for example. The slide restriction members 73 and 74 may be, for example, resin or metal cable ties, crimping rings, adhesive tapes, or the like. The slide restriction members 73 and 74 of the present embodiment are adhesive tapes. The slide restriction member 73 is wound around an end portion of the first path-restricting member 40 on the side not joined to the second path-restricting member 60, and the covering member 30. The slide restriction member 74 is wound around an end portion of the second path-restricting member 60 on the side not joined to the first path-restricting member 40, and the covering member 30.

Next, the operation of the present embodiment will be described.

The suppression member 63 keeps the receiver portion 65 and the lid 62 from moving away from each other. Accordingly, the receiver portion 65 and the lid 62, which constitute the covering portion 66, are maintained in a state of holding the first path restricting member 40 from the opposite sides. Accordingly, the first path restricting member 40 and the second path-restricting member 60 are maintained in a state of being joined to each other. The path of the wire harness body 11 is thus restricted continuously.

Next, the effects of the above embodiment will be described.

(1) The suppression member 63 is provided that suppresses separation of the lid 62 from the receiver portion 65 by pressing the receiver portion 65 and the lid 62 from outside the lid 62. This suppresses separation of the lid 62 from the receiver portion 65. The receiver portion 65 and the lid 62 hold the first path-restricting member 40 from the opposite sides. This suppresses looseness between the receiver portion 65 and the lid 62 compared with, for example, a configuration in which the lid 62 is integrally molded with the receiver portion 65 via the thin-walled hinge portion 67, and the lid 62 is locked to the receiver portion 65 only through engagement of the claw portions 68 in the closed state. That is, the configuration in which the thin-walled hinge portion 67 and the claw portions 68 are provided is more likely to loosen the receiver portion 65 and the lid 62 in the areas of the hinge portion 67 and the claw portions 68, but this can be avoided. Accordingly, the receiver portion 65 and the lid 62 can hold the first path-restricting member 40 from the opposite sides without looseness, thus suppressing looseness between the first path-restricting member 40 and the second path-restricting member 60. As a result, it is possible, for example, to suppress damage to the area where the first path restricting member 40 is attached to the second path-restricting member 60, and also stably restrict the path of the wire harness body 11.

(2) The suppression member 63, which is a flexible C-ring covering the receiver portion 65 and the lid 62 from outside, can suppress separation of the lid 62 from the receiver portion 65 with a simple configuration.

(3) The receiver portion 65 and the lid 62 each have an engaging recessed portion 71 serving as an engaging portion capable of engaging with the suppression member 63 in the lengthwise direction of the second path-restricting member 60, and can thus suppress a shift of the suppression member 63 in the lengthwise direction of the second path-restricting member 60.

(4) The attachment member that is attached to the first path-restricting member 40 is the second path-restricting member 60 that is attached to the periphery of the covering member 30 and restricts the path of the wire harness body 11. The receiver portion 65 is provided at an end portion of the second path-restricting member 60 in the lengthwise direction, and covers an end portion of the first path restricting member 40 in the lengthwise direction, partially in the circumferential direction. Thus, the first path-restricting member 40 is joined to the second path-restricting member 60 in the lengthwise direction. Accordingly, the first path-restricting member 40 and the second path-restricting member 60 continuously restrict the path of the wire harness body 11.

(5) The first path-restricting member 40 restricts the path of the linear portion 11A of the wire harness body 11, and the second path-restricting member 60 restricts the path of the bent portion 11B of the wire harness body 11. This continuously keeps the paths of the linear portion 11A and the bent portion 11B of the wire harness body 11 from deviating respective desired paths.

OTHER EMBODIMENTS

The above embodiment can be modified and implemented as follows. The above embodiment and the following modifications can be implemented in combination as long as no technical contradiction arises.

In the above embodiment, the suppression member 63 is a flexible C-ring that covers the receiver portion 65 and the lid 62 from outside. However, the suppression member 63 may be a suppression member having another structure as long as it can suppress separation of the lid 62 from the receiver portion 65 by pressing the receiver portion 65 and the lid 62 from outside.

Figure 6:
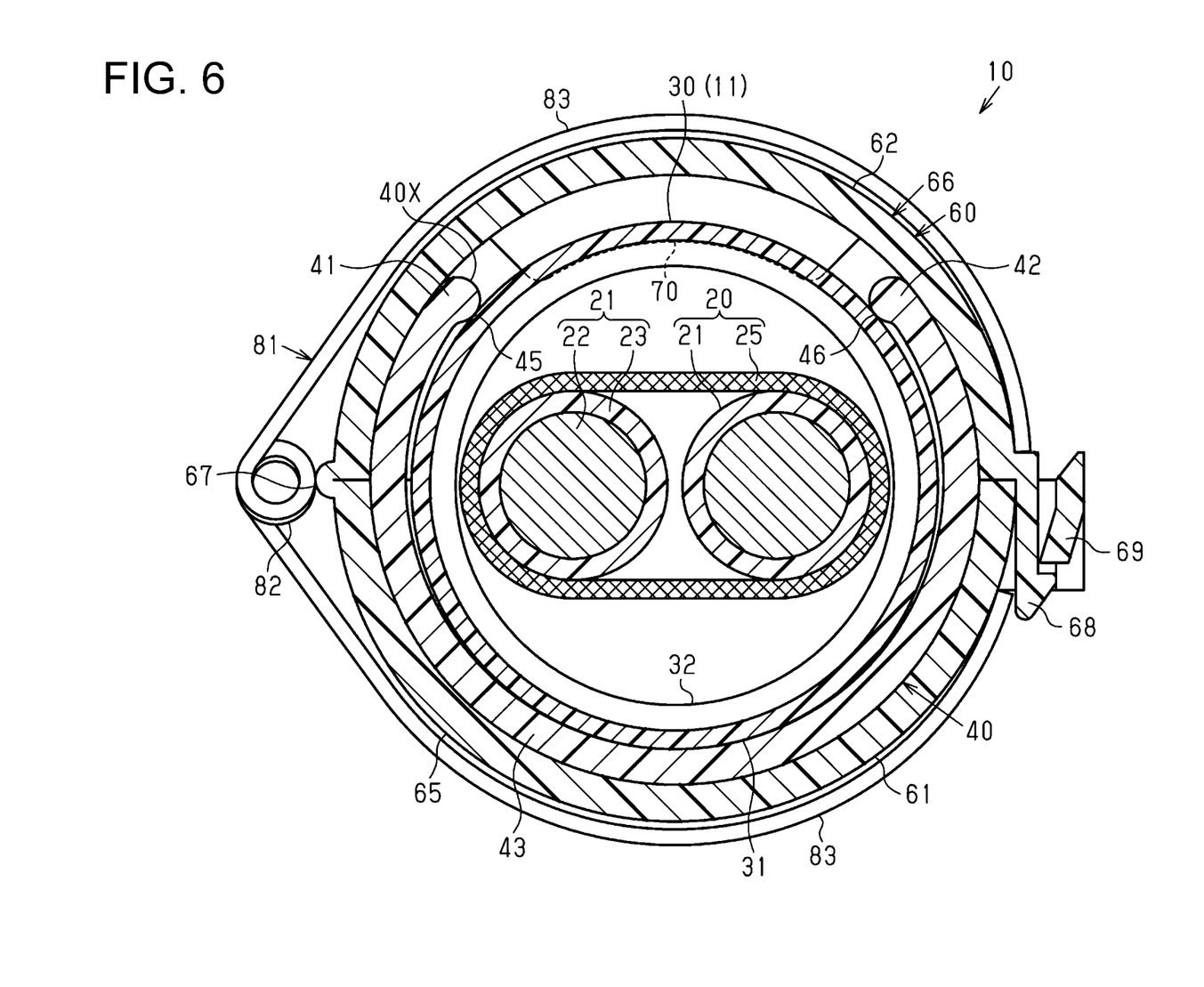
FIG. 6 is a schematic lateral cross-sectional view of a wire harness of a modification.

For example, a modification may be made as shown in FIG. 6. With the receiver portion 65 and the lid 62 in this example, the first end portion of the receiver portion 65 in the circumferential direction is joined to the second end portion of the lid 62 in the circumferential direction via the thin-walled hinge portion 67, in the same manner as the above embodiment. Note that the receiver portion 65 and the lid 62 in this example do not have the engaging recessed portions 71 of the above embodiment. A suppression member 81 in this example is a spring member (spring) that biases the second end side of the receiver portion 65 in the circumferential direction and the first end side of the lid 62 in the circumferential direction, in respective directions in which the second end side of the receiver portion 65 and the first end side of the lid 62 approach each other. The suppression member 81 is made of metal. The suppression member 81 is a spring member, and specifically is a helical torsion coil spring. The suppression member 81 has a coil portion 82 and arm portions 83 extending from respective ends of the coil portion 82. The coil portion 82 is arranged in an area corresponding to the hinge portion 67, and the arm portions 83 are arranged along the respective peripheral faces of the receiver portion 65 and the lid 62. Leading end portions of the arm portions 83 engage with the second end side of the receiver portion 65 in the circumferential direction and the first end side of the lid 62 in the circumferential direction. The suppression member 81 biases, with the leading end portions of the arm portions 83, the second end side of the receiver portion 65 in the circumferential direction and the first end side of the lid 62 in the circumferential direction, in respective directions in which the second end side of the receiver portion 65 and the first end side of the lid 62 approach each other.

With this configuration as well, the receiver portion 65 and the lid 62 can hold the first path-restricting member 40 from the opposite sides without looseness, thus suppressing looseness between the first path restricting member 40 and the second path-restricting member 60. Further, the suppression member 81 is a spring member that biases the second end side of the receiver portion 65 in the circumferential direction and the first end side of the lid 62 in the circumferential direction, in respective directions in which the second end side of the receiver portion 65 and the first end side of the lid 62 approach each other. Therefore, the biasing force of the spring member can favorably suppress separation of the lid 62 from the receiver portion 65.

Figure 7:
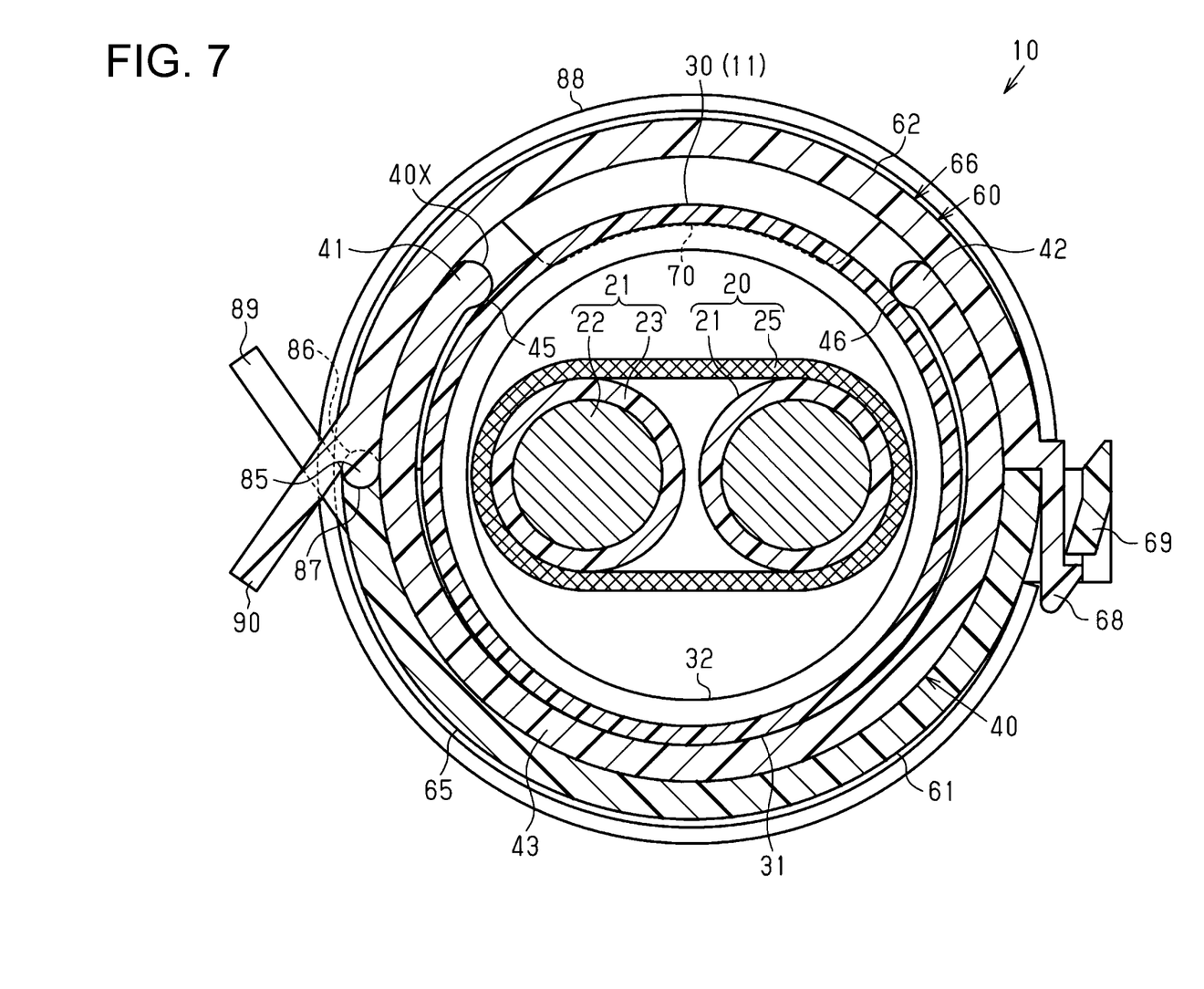
FIG. 7 is a schematic lateral cross-sectional view of a wire harness of a modification.

Alternatively, a modification may also be made as shown in FIG. 7, for example. With the receiver portion 65 and the lid 62 in this example, the first end portion of the receiver portion 65 in the circumferential direction is joined to the second end portion of the lid 62 in the circumferential direction via a thin-walled hinge portion 85. The receiver portion 65 and the lid 62 in this example are separate bodies. The hinge portion 85 is a combination of a hinge component 86 that is provided in the receiver portion 65 and a hinge component 87 that is provided in the lid 62. The lid 62 can rotate about the hinge portion 85 relative to the receiver portion 65. Note that the receiver portion 65 and the lid 62 in this example do not have the engaging recessed portions 71 of the above embodiment. A suppression member 88 in this example is a spring member that biases the second end side of the receiver portion 65 in the circumferential direction and the first end side of the lid 62 in the circumferential direction, in respective directions in which the second end side of the receiver portion 65 and the first end side of the lid 62 approach each other. The suppression member 88 is made of metal. The suppression member 88 is a spring member, and specifically is a C-spring. The suppression member 88 is arranged along the peripheral faces of the receiver portion 65 and the lid 62. Both end portions of the suppression member 88 engage with the second end side of the receiver portion 65 in the circumferential direction and the first end side of the lid 62 in the circumferential direction. The suppression member 88 biases, with both end portions of the suppression member 88, the second end side of the receiver portion 65 in the circumferential direction and the first end side of the lid 62 in the circumferential direction, in respective directions in which the second end side of the receiver portion 65 and the first end side of the lid 62 approach each other. The receiver portion 65 and the lid 62 have handle pieces 89 and 90 that protrude from the area near the hinge components 86 and 87, respectively. The handle pieces 89 and 90 intersect each other. The receiver portion 65 and the lid 62 relatively rotate and enter the open state by an operator holding the handle pieces 89 and 90, for example.

With this configuration as well, the receiver portion 65 and the lid 62 can hold the first path-restricting member 40 from the opposite sides without looseness, thus suppressing looseness between the first path-restricting member 40 and the second path-restricting member 60. Further, the suppression member 88 is a spring member that biases the second end side of the receiver portion 65 in the circumferential direction and the first end side of the lid 62 in the circumferential direction, in respective directions in which the second end side of the receiver portion 65 and the first end side of the lid 62 approach each other. Therefore, the biasing force of the spring member can favorably suppress separation of the lid 62 from the receiver portion 65. Further, providing the handle pieces 89 and 90 makes it easy to open the receiver portion 65 and the lid 62.

Figure 8:
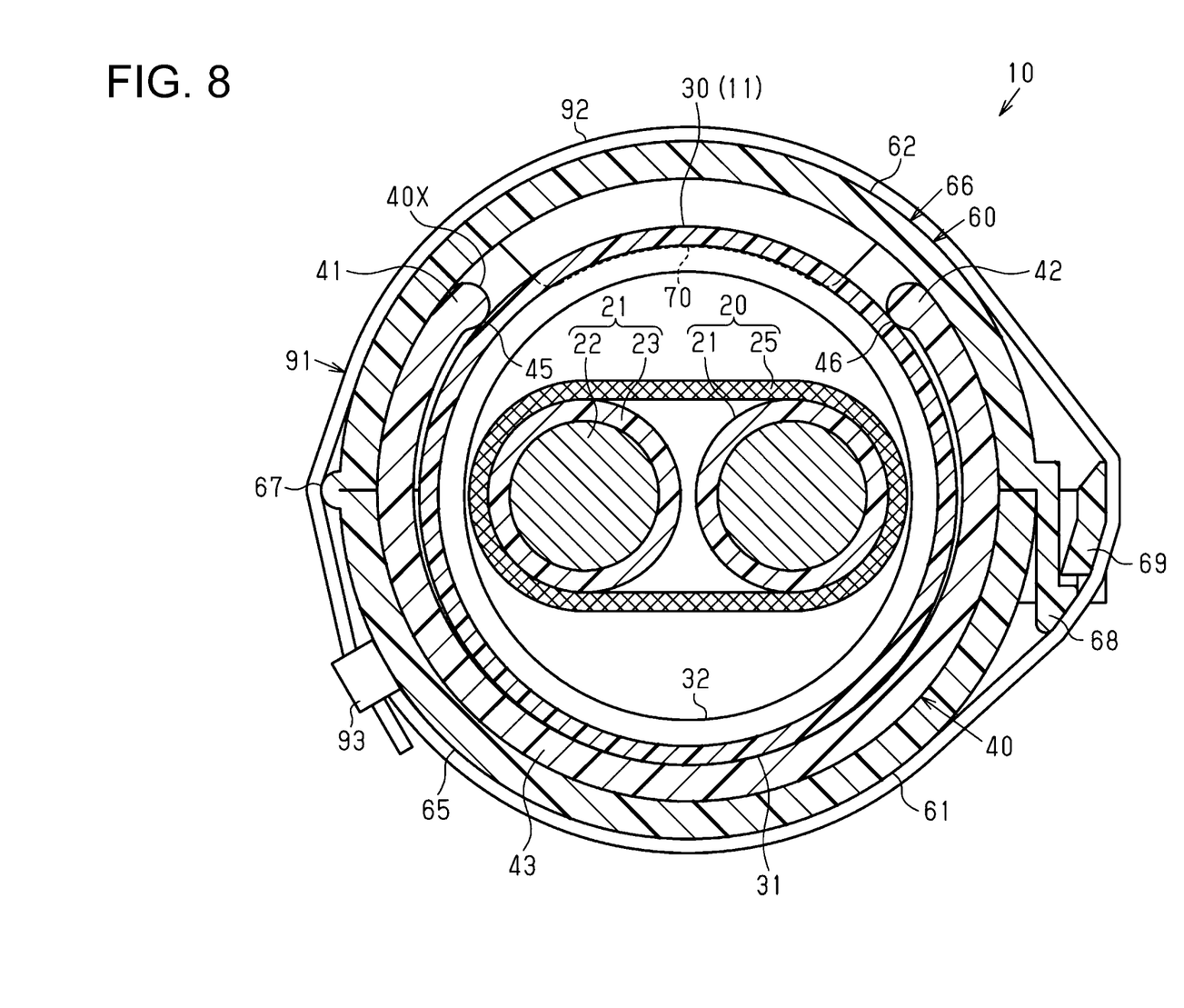
FIG. 8 is a schematic lateral cross-sectional view of a wire harness of a modification.

Alternatively, a modification may also be modified as shown in FIG. 8, for example. With the receiver portion 65 and the lid 62 in this example, the first end portion of the receiver portion 65 in the circumferential direction is joined to the second end portion of the lid 62 in the circumferential direction via the thin-walled hinge portion 67, in the same manner as the above embodiment. Note that the receiver portion 65 and the lid 62 in this example do not have the engaging recessed portions 71 of the above embodiment. Further, a suppression member 91 in this example is a cable tie that ties the receiver portion 65 and the lid 62 together while covering the entirety of the receiver portion 65 and the lid 62 in the circumferential direction. The suppression member 91 is made of metal or resin. The suppression member 91 in this example is made of resin. The suppression member 91 has a flexible and soft band portion 92 and a lock portion 93 provided at an end portion of the band portion 92 in the lengthwise direction. The lock portion 93 locks the band portion 92 by restricting, with the band portion 92 passed therethrough, movement of the band portion 92 in a direction in which the band portion 92 is pulled out that is opposite to the direction in which the band portion 92 is passed through the lock portion 93. The suppression member 91 ties the receiver portion 65 and the lid 62 together with the band portion 92 being passed through the lock portion 93 while covering the entirety of the receiver portion 65 and the lid 62 in the circumferential direction.

With this configuration as well, the receiver portion 65 and the lid 62 can hold the first path restricting member 40 from the opposite sides without looseness, thus suppressing looseness between the first path-restricting member 40 and the second path-restricting member 60. Further, the suppression member 91 is a cable tie that ties the receiver portion 65 and the lid 62 together while covering the entirety of the receiver portion 65 and the lid 62 in the circumferential direction. Therefore, separation of the lid 62 from the receiver portion 65 can be suppressed with a simple configuration.

In the above embodiment, the receiver portion 65 and the lid 62 each have an engaging recessed portion 71 serving as an engaging portion capable of engaging with the suppression member 63 in the lengthwise direction of the second path restricting member 60. However, the receiver portion 65 and the lid 62 are not limited to this configuration, and a configuration in which the receiver portion 65 and the lid 62 do not have the engaging recessed portion 71 may alternatively be employed, for example. Further, for example, the engaging recessed portions 71 may be modified to engaging ribs serving as engaging portions that protrude from the peripheral faces of the receiver portion 65 and the lid 62.

In the above embodiment, only one suppression member 63 is provided. However, the number of suppression members 63 is not limited to one, and two or more suppression members 63 may alternatively be provided in the lengthwise direction of the covering portion 66, for example.

In the above embodiment, the lid 62 has five protrusions 70. However, the number of protrusions 70 is not limited to five, and may be changed, or no protrusion 70 may be provided, for example.

The second path-restricting member 60 of the above embodiment is formed to restrict the path of the bent portion 11B of the wire harness body 11. However, the second path-restricting member 60 is not limited to this configuration. For example, the second path-restricting member 60 may be modified to have a shape that restricts the path of the linear portion 11A of the wire harness body 11. The second path-restricting member 60 in this case is modified so that the bent shape of the body portion 64 is changed to a linearly extending shape, for example.

In the above embodiment, the attachment member that is attached to the first path-restricting member 40 is embodied as the second path-restricting member 60. However, the attachment member is not limited to this embodiment. For example, the attachment member may alternatively be embodied as a vehicle attachment member for attaching the first path restricting member 40 to the vehicle V.

The structure of the first path-restricting member 40 of the above embodiment can be modified as appropriate. For example, as long as the first path restricting member 40 has the insertion opening 40X and has a structure that can be attached to the periphery of the covering member 30, other structures thereof are not specifically limited.

The protruding portion 45 of the above embodiment may be provided at a position farther from the insertion opening 40X than the leading end of the first end portion 41 in the circumferential direction of the first path-restricting member 40.

The protruding portion 46 of the above embodiment may be provided at a position farther from the insertion opening 40X than the leading end of the second end portion 42 in the circumferential direction of the first path-restricting member 40.

The protruding portions 45 and 46 of the above embodiment may be provided in portions of the first path-restricting member 40 in the lengthwise direction.

At least either the protruding portion 45 or 46 of the above embodiment may be omitted.

The first path-restricting member 40 of the above embodiment may be configured so that the thickness of the joint portion 43 in the radial direction varies in the circumferential direction.

The shape of the joint portion 43 of the first path-restricting member 40 of the above embodiment is not limited to an arc shape, and may be modified to an elliptical shape or a U-shape, for example.

In the above embodiment, the first path-restricting member 40 and the second path-restricting member 60 are harder than the covering member 30, but there is no limitation to this configuration. The first path-restricting member 40 and the second path-restricting member 60 may be as hard as or less hard than the covering member 30. That is, the first path-restricting member 40 and the second path-restricting member 60 need only act to make the wire harness body 11 less likely to bend than when the first path-restricting member 40 and the second path-restricting member 60 are not attached thereto.

The covering member 30 of the above embodiment may be a resin corrugated tube with a metal layer containing a metallic material provided on an outer face thereof, for example.

The covering member 30 of the above embodiment is not limited to a corrugated tube, and may alternatively be, for example, a covering member that does not have a large diameter portion 31 or a small-diameter portion 32.

The covering member 30 of the above embodiment may have slits extending in the lengthwise direction of the covering member 30.

In the above embodiment, the electric wires 21 are high voltage electric wires. However, the electric wires 21 are not limited to this configuration, and may alternatively be low-voltage electric wires, for example.

In the electric wire member 20 of the above embodiment, the electromagnetic shield member is embodied as the braided member 25. However, the electromagnetic shield member is not limited to this configuration. For example, the electromagnetic shield member of the electric wire member 20 may alternatively be embodied as a metal foil.

The braided member 25 in the electric wire member 20 of the above embodiment may be omitted.

In the above embodiment, the number of electric wires 21 that constitute the electric wire member 20 is two. However, the number of electric wires 21 is not limited thereto. The number of electric wires 21 may be one, or may be three or more.

The arrangement relationship between the inverter M1 and the high-voltage battery M2 in the vehicle V is not limited to the above embodiment, and may be changed as appropriate, as per the vehicle configuration.

In the above embodiment, a plurality of in-vehicle devices to which the wire harness 10 is electrically connected are embodied as the inverter M1 and the high-voltage battery M2. However, the in-vehicle devices are not limited thereto. The plurality of in-vehicle devices to which the wire harness 10 is electrically connected are not specifically limited as long as they are electrical devices installed in the vehicle V.

The embodiment disclosed herein is in all respects illustrative and should not be considered restrictive. The scope of the present disclosure is indicated not by the above-described meanings but by the claims, and is intended to encompass all changes made within the meanings and scope equivalent to the claims.

What is claimed is:

1. A wire harness comprising:
a wire harness body having an electric wire and a cover covering a periphery of the electric wire;
a first path restrictor attached to a periphery of the cover and restricting a path of the wire harness body; and
an attachment attached to a periphery of a portion of the first path restrictor in a lengthwise direction thereof, wherein:
the first path restrictor has an insertion opening that is open in a direction orthogonal to the lengthwise direction of the first path restrictor and extends over an entirety of the first path restrictor in the lengthwise direction,
the attachment has:
a receiver covering the first path restrictor partially in a circumferential direction thereof,
a lid covering, together with the receiver, an entire periphery of the first path restrictor, and
a suppression member suppressing separation of the lid from the receiver by pressing the receiver and the lid from outside the lid, and
the receiver and the lid hold the first path restrictor from opposite sides, and are attached to each other by a hinge that protrudes outward and fits into a recessed portion formed in the suppression member, the hinge suppressing rotation of the suppression member relative to the receiver and the lid.

2. The wire harness according to claim 1, wherein the suppression member is a flexible C-ring covering the receiver and the lid from outside.

3. The wire harness according to claim 1, wherein at least one of the receiver and the lid has an engagement that engages with the suppression member in a lengthwise direction of the attachment.

4. The wire harness according to claim 1, wherein:
the attachment is a second path restrictor having a body portion attached to the periphery of the cover and defining the path of the wire harness body, and
the receiver is connected at an end of the body portion of the second path restrictor in a lengthwise direction thereof and covers an end of the first path restrictor in the lengthwise direction thereof, partially in the circumferential direction.

5. The wire harness according to claim 4, wherein:
the first path restrictor has a linear portion that defines a linear part of the path of the wire harness body, and
the second path restrictor has a bent portion that defines a bent part of the path of the wire harness body.

6. The wire harness according to claim 1, wherein the receiver and the lid are held together by a claw portion that connects with an engaged portion, and the suppression member includes a gap into which the claw portion and the engaged portion fit.

7. A wire harness comprising:
a wire harness body having an electric wire and a cover covering a periphery of the electric wire;
a first path restrictor attached to a periphery of the cover and restricting a path of the wire harness body; and
an attachment attached to a periphery of a portion of the first path restrictor in a lengthwise direction thereof, wherein:
the first path restrictor has an insertion opening that is open in a direction orthogonal to the lengthwise direction of the first path restrictor and extends over an entirety of the first path restrictor in the lengthwise direction,
the attachment has:
a receiver covering the first path restrictor partially in a circumferential direction thereof,
a lid covering, together with the receiver, an entire periphery of the first path restrictor, and
a suppression member suppressing separation of the lid from the receiver by pressing the receiver and the lid from outside the lid, the suppression member surrounding a majority of a circumference of the receiver and a majority of a circumference of the lid, the suppression member including a gap such that the suppression member does not surround an entirety of the circumference of the receiver and an entirety of the circumference of the lid,
the receiver and the lid hold the first path restrictor from opposite sides, and
the receiver and the lid are held together by a claw portion that connects with an engaged portion, and the claw portion and the engaged portion fit into the gap of the suppression member.

8. The wire harness according to claim 7, wherein:
the receiver includes (i) a first hinge component and (ii) a first handle piece that is adjacent to the first hinge component;
the lid includes (i) a second hinge component that engages the first hinge component and (ii) a second handle piece that is adjacent to the second hinge component; and
the first handle piece and the second handle piece are positioned relative to each other such that squeezing the first handle piece and the second handle piece together causes the gap to widen to the gap, thereby allowing the receiver and the lid to fit over the first path restrictor.

9. The wire harness according to claim 7, wherein the suppression member is a flexible C-ring.

10. The wire harness according to claim 7, wherein the suppression member is a metal spring.

* * * * *